(12) United States Patent
Maier et al.

(10) Patent No.: US 9,162,714 B2
(45) Date of Patent: Oct. 20, 2015

(54) FRONT END MODULE

(71) Applicant: Daimler AG, Stuttgart (DE)

(72) Inventors: Hans-Peter Maier, Nagold (DE); Stefan Kehres, Munich (DE); Jochen Roesch, Boeblingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/351,472

(22) PCT Filed: Oct. 10, 2012

(86) PCT No.: PCT/EP2012/004133
§ 371 (c)(1),
(2) Date: Apr. 11, 2014

(87) PCT Pub. No.: WO2013/053447
PCT Pub. Date: Apr. 18, 2013

(65) Prior Publication Data
US 2014/0284966 A1 Sep. 25, 2014

(30) Foreign Application Priority Data
Oct. 14, 2011 (DE) .......................... 10 2011 116 208

(51) Int. Cl.
*B60R 13/00* (2006.01)
*B62D 29/00* (2006.01)
*B62D 25/08* (2006.01)

(52) U.S. Cl.
CPC ............ *B62D 29/004* (2013.01); *B62D 25/085* (2013.01)

(58) Field of Classification Search
CPC .......... B01D 33/0093; B01D 33/0376; B01D 33/0384; B62D 25/082; B62D 21/152; C08L 2666/06; C08L 2666/02; C08L 23/16; C08L 2666/04; C08L 53/00
USPC .................. 296/40, 193.09, 203.02; 180/68.4
See application file for complete search history.

(56) References Cited

U.S. PATENT DOCUMENTS

| | | | | |
|---|---|---|---|---|
| 5,409,288 A * | 4/1995 | Masuda | ................... | 296/193.09 |
| 5,580,122 A * | 12/1996 | Muehlhausen | .......... | 296/193.02 |
| 5,658,041 A * | 8/1997 | Girardot et al. | .......... | 296/193.09 |
| 6,189,958 B1 * | 2/2001 | Guyomard et al. | ...... | 296/193.09 |
| 6,273,496 B1 * | 8/2001 | Guyomard et al. | ...... | 296/193.09 |
| 6,287,442 B1 * | 9/2001 | Tarahomi | ..................... | 204/479 |
| 6,357,821 B1 * | 3/2002 | Maj et al. | ................. | 296/193.09 |

(Continued)

FOREIGN PATENT DOCUMENTS

| | | |
|---|---|---|
| DE | 699 16 784 T2 | 10/2004 |
| DE | 603 00 915 T2 | 4/2006 |

(Continued)

OTHER PUBLICATIONS

Corresponding International Search Report with English Translation dated Dec. 13, 2012 (four (4) pages).

(Continued)

*Primary Examiner* — Kiran B Patel
(74) *Attorney, Agent, or Firm* — Crowell & Moring LLP

(57) ABSTRACT

A front end module for a motor vehicle includes a tubular cross-member and injection molded components made from plastic, which are injected onto the cross-member. At least two of the injection molded components are connected to each other via the cross-member and separately connected to the cross-member.

5 Claims, 1 Drawing Sheet

(56) References Cited

U.S. PATENT DOCUMENTS

| | | | |
|---|---|---|---|
| 6,502,653 B1* | 1/2003 | Balzer et al. | 180/68.4 |
| 6,523,886 B2* | 2/2003 | Hoffner et al. | 296/203.02 |
| 6,547,317 B1* | 4/2003 | Cheron et al. | 296/193.01 |
| 6,619,419 B1* | 9/2003 | Cheron et al. | 180/311 |
| 6,631,562 B1* | 10/2003 | Balzer et al. | 29/897.2 |
| 6,634,702 B1* | 10/2003 | Pleschke et al. | 296/187.04 |
| 6,679,545 B1* | 1/2004 | Balzer et al. | 296/193.09 |
| 6,681,876 B1* | 1/2004 | Haneda et al. | 180/68.4 |
| 6,708,790 B2* | 3/2004 | Ozawa et al. | 180/68.4 |
| 6,729,681 B2* | 5/2004 | Yustick | 296/193.01 |
| 6,796,604 B2 | 9/2004 | Igura et al. | |
| 6,877,797 B2* | 4/2005 | Henderson et al. | 296/203.02 |
| 6,973,984 B2* | 12/2005 | Cheron et al. | 180/68.1 |
| 7,014,257 B2* | 3/2006 | Lazzeroni et al. | 296/203.02 |
| 7,097,239 B2 | 8/2006 | Lazzeroni | |
| 7,114,587 B2* | 10/2006 | Mori et al. | 180/68.3 |
| 7,117,926 B2* | 10/2006 | Mori et al. | 165/67 |
| 7,325,863 B2* | 2/2008 | Uchiyama | 296/193.09 |
| 7,377,579 B2* | 5/2008 | Kwon | 296/193.09 |
| 7,497,289 B2* | 3/2009 | Kwun et al. | 180/68.4 |
| 7,517,006 B2* | 4/2009 | Kageyama et al. | 296/187.09 |
| 7,540,550 B1* | 6/2009 | Huber et al. | 296/29 |
| 7,644,966 B2* | 1/2010 | Huber et al. | 293/155 |
| 7,766,418 B2* | 8/2010 | Hemmersmeier | 296/193.1 |
| 7,887,125 B2* | 2/2011 | Tazaki et al. | 296/193.1 |
| 7,891,850 B2* | 2/2011 | Breisacher | 362/505 |
| 7,914,071 B2* | 3/2011 | Saitou et al. | 296/193.09 |
| 7,967,373 B2* | 6/2011 | Ritz | 296/193.09 |
| 7,988,225 B2* | 8/2011 | Goldsberry | 296/193.09 |
| 8,007,035 B2* | 8/2011 | Jyo et al. | 296/193.09 |
| 8,047,603 B2* | 11/2011 | Goral et al. | 296/193.03 |
| 8,109,560 B2* | 2/2012 | Joly-Pottuz | 296/187.09 |
| 8,118,351 B2* | 2/2012 | Gonin et al. | 296/193.09 |
| 8,132,851 B2* | 3/2012 | Steller et al. | 296/187.04 |
| 8,133,424 B2 | 3/2012 | Riviere et al. | |
| 8,167,361 B2* | 5/2012 | Riviere et al. | 296/193.09 |
| 8,191,959 B2* | 6/2012 | Ritz | 296/187.09 |
| 8,196,978 B2* | 6/2012 | Shin | 293/115 |
| 8,220,864 B2* | 7/2012 | Mildner et al. | 296/187.09 |
| 8,308,225 B2* | 11/2012 | Owen et al. | 296/193.09 |
| 8,313,138 B2* | 11/2012 | Guyomard et al. | 296/193.09 |
| 8,348,333 B2* | 1/2013 | Iammarino et al. | 296/187.09 |
| 8,408,346 B2* | 4/2013 | Iania | 180/68.4 |
| 8,440,279 B2 | 5/2013 | Riviere et al. | |
| 8,585,267 B2* | 11/2013 | Nakagawa | 362/549 |
| 8,628,140 B2* | 1/2014 | Malek et al. | 296/193.01 |
| 8,646,554 B2* | 2/2014 | Takahashi et al. | 180/68.4 |
| 8,746,783 B2* | 6/2014 | Townson et al. | 296/193.09 |
| 8,845,010 B2* | 9/2014 | Townson et al. | 296/193.09 |
| 2002/0060476 A1* | 5/2002 | Cantineau et al. | 296/194 |
| 2002/0070062 A1* | 6/2002 | Joutaki et al. | 180/68.4 |
| 2002/0084122 A1* | 7/2002 | Emori et al. | 180/68.4 |
| 2004/0046422 A1* | 3/2004 | Igura et al. | 296/193.09 |
| 2004/0160088 A1* | 8/2004 | Staargaard et al. | 296/193.09 |
| 2004/0222670 A1* | 11/2004 | Andre et al. | 296/193.09 |
| 2005/0040672 A1* | 2/2005 | Andre | 296/187.09 |
| 2005/0134092 A1* | 6/2005 | Lazzeroni | 296/203.01 |
| 2005/0134093 A1* | 6/2005 | Borkowski et al. | 296/203.02 |
| 2005/0140173 A1* | 6/2005 | Riviere et al. | 296/187.01 |
| 2005/0252704 A1* | 11/2005 | Kim | 180/68.4 |
| 2005/0275227 A1* | 12/2005 | Ahn | 293/155 |
| 2005/0275248 A1* | 12/2005 | Lee | 296/193.09 |
| 2006/0175873 A1* | 8/2006 | Miyata et al. | 296/203.02 |
| 2006/0181089 A1* | 8/2006 | Andre et al. | 293/120 |
| 2006/0237999 A1* | 10/2006 | Sasaki | 296/203.02 |
| 2008/0038576 A1* | 2/2008 | Riviere et al. | 428/586 |
| 2008/0122260 A1* | 5/2008 | Meier | 296/190.08 |
| 2008/0185872 A1* | 8/2008 | Povinelli et al. | 296/193.09 |
| 2008/0217960 A1* | 9/2008 | Kochert et al. | 296/193.06 |
| 2008/0231084 A1* | 9/2008 | Mishima | 296/203.02 |
| 2008/0308333 A1* | 12/2008 | Kapadia et al. | 180/68.4 |
| 2009/0026806 A1* | 1/2009 | Riviere et al. | 296/193.09 |
| 2009/0212600 A1* | 8/2009 | Fischer et al. | 296/193.09 |
| 2010/0060039 A1* | 3/2010 | Riviere | 296/193.09 |
| 2013/0026791 A1* | 1/2013 | Huber et al. | 296/193.09 |
| 2013/0069393 A1* | 3/2013 | Kihara et al. | 296/203.02 |
| 2014/0284966 A1* | 9/2014 | Maier et al. | 296/193.04 |

FOREIGN PATENT DOCUMENTS

| | | |
|---|---|---|
| DE | 60 2004 002 074 T2 | 3/2007 |
| DE | 10 2005 031 723 A1 | 1/2008 |
| DE | 10 2009 014 172 A1 | 9/2010 |
| EP | 1 036 729 A1 | 9/2000 |
| EP | 1 724 185 A1 | 11/2006 |
| EP | 1 849 686 A1 | 10/2007 |
| EP | 2 223 843 A2 | 9/2010 |
| WO | WO 2004/056610 A2 | 7/2004 |

OTHER PUBLICATIONS

German-language Written Opinion dated Dec. 13, 2012 (PCT/ISA/237) (six (6) pages).

German Search Report with English Translation dated May 31, 2012 (ten (10) pages).

* cited by examiner

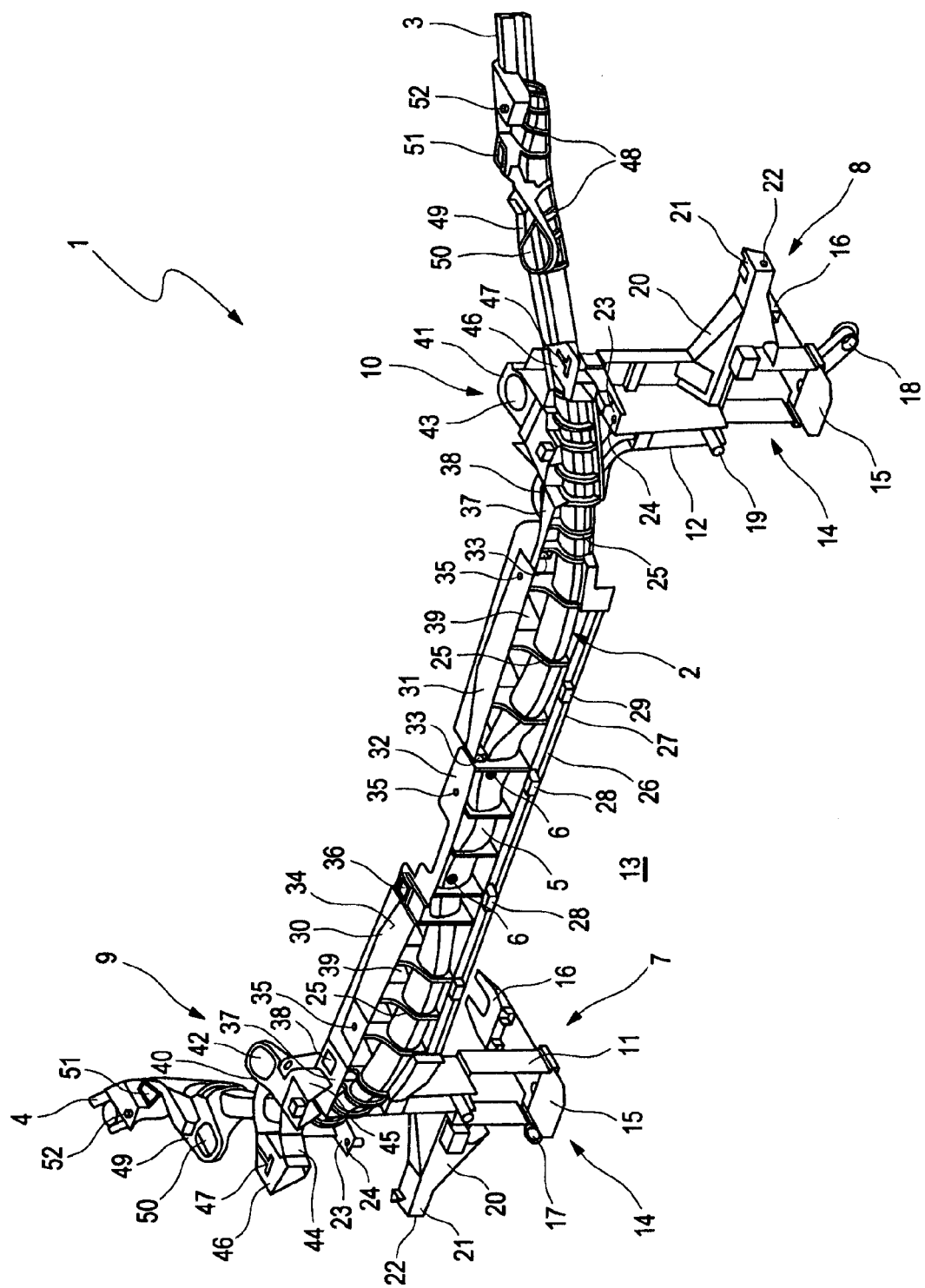

FRONT END MODULE

BACKGROUND AND SUMMARY OF THE INVENTION

Exemplary embodiments of the invention relate to a front end module

European patent document EP 1 849 686 A1 discloses a front end module with a pipe formed by means of fluidic internal pressure, which has two neckings axially spaced apart, into which an injection molded component made from plastic is injected. For this purpose, rings are provided surrounding the pipe and from which the injection molded component, referred to as columns, extrudes in one piece vertically downwards. Both separate injection molded components are adjacent to a receiver for the engine radiator. A respective installation space for lighting units is connected laterally. The composite component made from the metallic pipe and the injected plastic components form the front end module. The hold of the two columns on the pipe, which results from the shrinking of the plastic on the pipe, is, however, insufficient with respect to higher mechanical loads, such that the columns are able to rotate around the pipe relatively easily and can also slip axially inside the extension of the neckings.

Exemplary embodiments of the invention are directed to a front end module of this kind such that an improved hold of the injection molded components on the cross-member is achieved in a simple way.

In accordance with the invention there is a separate connection of at least two of the injected plastic components, with which the indirect connection is excluded by the cross-member, achieves a force distribution that impedes a release of the respective plastic component part on the cross-member, if it does not prevent it completely. For this purpose, during a loading of one of the plastic components, a moment of inertia is produced in the other plastic component around the cross-member axis due to the connection, the moment of inertia in turn exerting a counter force on the loaded plastic component, which causes a torsional stress in the connection element of the connection and thus counteracts the loading and therefore improves the hold of the one plastic component.

In an advantageous development of the invention, the cross-member is bent, wherein at least one of the plastic components is arranged in a bending region of the cross-member over a longitudinal section. For this reason, the plastic components have a particularly strong hold on the cross-member, as the plastic component set in the bending region is no longer able to move axially or radially or at most when exerting very large forces. In a further advantageous development of the invention, the profile cross-section of the tubular cross-member is formed to be non-circular at least locally, wherein at least one of the plastic components is placed on this non-circular position. For this reason, the plastic component also has an improved hold in the circumferential direction of the cross-member, wherein this is set to be non-rotatable on the cross-member. With the additional arrangement in the bending region, the plastic component or the plastic components that are connected to one another has a particularly good hold on the cross-member.

In a further advantageous embodiment of the invention, the connection of the plastic components is firmly formed. This simplifies the formation of the connection considerably, as no connecting elements are required at all and only a single cavity for the plastic components to be formed and to be connected is necessary. The plastic components can be advantageously produced at the same time in a single work step and with a single tool and thus are produced with procedural economy. Additionally, the firmness of connection provides an increased stability for the plastic component arrangement. It is conceivable, alternatively or additionally to the firmness of connection, to provide a positive connection between the components. For this purpose, the components can be injected at different points in time, such that the already-set component is equipped with positive connection elements such as elevations and troughs, which are positively surrounded by still liquid or viscous injection molding of the other component or of the other components. Due to the molding heat of the still liquid injection molding, it is possible that the already set component can be melted easily such that a firm connection can also be achieved at the same time as the positive connection.

The cross-member can likewise have positive connection elements, which are surrounded by the injection molding of the formed component or which form a supporting operative connection to the injection molding during injecting. These can, for example, be formed by a reshaping of the hollow cross-member, in particular by means of fluidic internal pressure or by a combination of the inner pressure with a mechanical press processing, for example by means of a stamp. The cross-member can also preferably have a shape deviating from a rotationally-symmetrical cross-sectional outline, for example an oval or a square shape. This is also preferably found where the injection molding fits against the cross-member, such that the injected plastic also has an anti-rotation feature and thus an improved hold on the cross-member due to the cross-sectional shape.

According to a particularly preferred development of the invention, the injection molded components include two columns thatthe extrude perpendicularly downwards and are spaced apart axially. These border the side of the engine radiator receiver and are axially spaced apart from the ends of the cross-member. The cross-member has injected longitudinal and transverse ribs, which together form a net surrounding the cross-member and connect the columns to one another in the region of the cross-member. Due to the formation of a net, which surrounds the cross-member in the space between the columns, an extremely rigid connection is created with a low installation space requirement and material usage, the connection not only being rigid in all directions but also stiffening the entire plastic complex and the cross-member. Due to the extremely rigid connection, a secure hold for the plastic components on the cross-member is created even in the case of high mechanical forces.

According to a preferred development of the invention, multifunctional components are created due to the formation of the injection molded components as columns, the multifunctional components not only forming a frame for the engine radiator receiver but also forming a partial frame for the lighting units from the outside in, on which fixing positions for the lighting unit are formed in one piece. Furthermore, parallelogram-shaped receivers, which are similarly formed in one piece, for the crash boxes and/or an insert device in the lower side member and/or a hanging eyelet for the auxiliary heating system and/or for the washing water container and/or for the Z-support, can be formed on the columns.

According to a further preferred embodiment of the invention, the thus already highly integrative character of the front end module is further increased by the ribs between the columns being outlet points for multiple functional configurations of the plastic injection molded complex. These are thus connected in one piece to a sealing frame for the engine radiator and/or to fixing elements for the proximity control system and/or for a deflection plate to prevent intake of snow and/or for the engine radiator and/or to levelling elements for a bumper and the engine radiator and/or to guiding walls for the air intake and/or to receivers for engine hood bumpers and/or to a hanging device for a support strut to support the engine hood and/or support plates for the upper edge of a body component.

Furthermore, the ends of the cross-member could preferably have transverse and longitudinal ribs that are sprayed on and connected to one another, which bear receivers for engine hood bumpers in one piece and/or for the fixing of a handling device to transport and position the front end module in the installation. For installation space and/or weight-saving considerations, these plastic coatings can be formed separately from the plastic injection molded complex detailed above. It is, however, conceivable for these plastic coatings to likewise be connected to the plastic injection molded complex in one piece for an improved hold on the cross-member.

In a further preferred embodiment of the invention, the cross-member has fixing elements for the engine hood lock. These are represented in the form of holes, by means of which the lock can, for example, be screwed on. The holes can be created to be precisely positioned and with a highly precise hole pattern during the reshaping procedure of the cross-member, which occurs using inner pressure reshaping. For this purpose, punching stamps are integrated into the reshaping tool, which are not only able to punch out slugs from the tubular cross-member but also close the created holes in a way that seals them using high pressure. This is achieved by a conicity of the stamp, which is connected to the cutting edge and is immersed in the hole. The plastic is injected during the reshaping procedure or immediately after it, the plastic forming the partial high-filigree plastic components after setting. On completion of the reshaping, the inner pressure is reduced to a support pressure, such that a collapse of the cross-member due to the incidental injection molding pressure is prevented.

BRIEF DESCRIPTION OF THE DRAWING FIGURE

The invention is explained in more detail below by means of an exemplary embodiment depicted in the drawing.

Here, FIG. 1 shows a perspective view of a front end module according to the invention having a cross-member coated with plastic.

DETAILED DESCRIPTION

In FIG. 1, a front end module 1 for a motor vehicle is depicted having a tubular cross-member 2 and injection molded components made from plastic, which are injected onto the cross-member 2. The cross-member 2 can consist of metallic material, in particular a light metal or a light metal alloy. The use of fiber-reinforced plastic is also conceivable.

The cross-member 2 has a bent course, wherein its ends 3 and 4 point laterally backwards, so towards the rear of the vehicle. The cross-member is formed to be undulating in the center 5 and there has fixing elements 6 in the form of screw holes for the engine hood lock.

The cross-section of the cross-member is adapted according to need to the respective incidental mechanical and installation space-specific requirements and deviates as far as possible from a rotational symmetry. Herein, in particular, a box-shaped geometry prevails. The ends 3 and 4 are flattened in order to ensure a better connection to the upper side member plane.

The injection molded component includes two columns 7 and 8 that project perpendicularly downwards, are spaced apart axially and are arranged in the bending region 9 and 10 of the cross-member 2. The columns 7 and 8, which are at a distance axially from the ends 3, 4 of the cross-member 2, border the engine radiator receiver 13 laterally on their sides 11, 12 that are facing towards each other.

Both columns 7 and 8 have a frame-like receiver 15 having a parallelogram-shaped contour for a crash box on the lower end 14, wherein a strut-like insertion device 16 connects to the receiver 15 from behind in a respective lower side member. A hanging eyelet 17 for an auxiliary heating system is situated on the column 7 on the lower end 14 next to the receiver 15, projecting from the outside in. In the same way, a hanging eyelet 18 for a washing water container is connected to the lower end 14 of the column 8. A fixing position 19 for the Z-support is formed half-way up the column 8 on the inside, so on the side 12 thereof. Furthermore, an arm 20 extrudes outwards on both columns 7 and 8 respectively above the receiver 15, on the end of which 21 is formed a fixing position 22 for the lighting unit. Short struts 23 that point forward are formed close to the cross-member on the upper end of the columns 7 and 8, the struts 23 having further fixing positions 24 for the lighting unit on their free ends. The columns 7, 8 are connected in one piece to the receivers 15, the insertion device 15, the hanging eyelets 17, 18, the fixing positions 19, 22 and 24 as well as the arm 20 and the struts 23.

The columns 7, 8 are connected to each other separately to the cross-member 2. For this purpose it is of course fundamentally conceivable that the connection is achieved by separate connection components. According to the exemplary embodiment this is formed firmly with the columns 7, 8 and is formed by longitudinal and transverse ribs 25, which are injected between the columns 7, 8 on the cross-member 2. The longitudinal and transverse ribs 25 together form a net that surrounds the cross-member 2, wherein the columns 7, 8 extrude from ribs 25.

The ribs 25 bear a sealing frame 26 for the engine radiator which is directly connected to the underside of the cross-member and runs along the cross-member 2 and on which fixing elements 28 for the proximity control system and a lower fixing element 29 for a deflection plate to prevent the intake of snow are formed on its front side 27 in the form of screw positions. Furthermore, the ribs 25 bear three support plates 30, 31, 32 above the cross-member 2 for the upper edge of a body component, which likewise extend along the cross-member 2. On the support plate 31, two upper fixing elements 33 for the deflection plate to prevent the intake of snow are formed on the end of the front side, and fixing elements, preferably in the form of screw holes 35 for the body component to be installed are formed on the upper side 34 of the support plates, 30, 31, 32. The support plate 30 has levelling elements 36 for a bumper and the engine radiator on the upper side 34 in the transition to the central support plate 33. Brackets 37 having fixing elements 38 for the engine radiator are formed between the support plate 31 and the column 8 and between the support plate 30 and the column 7. Guiding walls 39 for the intake of air are formed on the ribs 25, the guiding walls 29 lying behind the support plates 30 and 31 in the cross-member plane and pointing backwards in the direction of the rear of the vehicle. As well as the brackets 37 in the direction of the respective cross-member ends 3,4, further brackets 40, 41 that are set upwards on the upper side are formed on the ribs 25, which lie in the axial extension of the columns 7, 8 and have receivers 42, 43 for engine hood bumpers. A hanging device 45 for a support strut to support the engine hood is formed on the inner side 44 of the bracket 40. Two brackets 46 that extrude frontwards and outwards are formed on the ribs 25 in the bending region 9,10 of the cross-member 2 lying approximately in the horizontal plane of the receivers 42, 43, the brackets 46 having, on the upper side, further support surfaces and fixing elements 47 for the body component to be installed. Usually, the struts 23 are formed on these brackets 46, to which the columns 7 and 8 are also connected. All depicted construction elements and surfaces consisting of injected plastic are connected to one another firmly, i.e. in one piece.

Further ribs 48 are injected onto the transverse body 2 separately between the ends 3,4 of the cross-member 2 and the columns 7,8, on which ribs, on the upper side, brackets 49 that extrude forwards, having further receivers 50 for engine hood bumpers, and a receiver 51 for the releasable fixing of handling equipment to transport and position the front end module 1 in the installation are formed. Additionally, a further fixing element 52 still is formed respectively on the ribs 48 for the connection of the lighting unit. Whilst the brackets 49 are formed close to the columns, the fixing element 52 is formed at a distance to the columns. The receiver 51 lies therebetween.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A front end module for a motor vehicle, comprising:
    a tubular cross-member; and
    plastic injection molded components that are injection molded around the tubular cross-member, wherein the plastic injection molded components:
        contain two columns that project perpendicularly downward from the tubular cross-member,
        are axially spaced so as to laterally border an engine radiator receiver, and
        are arranged at a distance axially from ends of the tubular cross-member, whereby the tubular cross-member has injection-molded longitudinal and transverse ribs, which form a net structure that surrounds the tubular cross-member.

2. The front end module of claim 1, wherein formed in one piece on at least one of the two columns is
    a parallelogram-shaped receiver of a crash box,
    an insertion device in a lower side member,
    a hanging eyelet configured for an auxiliary heating system or for a washing water container,
    fixing positions configured for a lighting unit for the lighting unit, or
    a fixing position for a Z-support.

3. The front end module of claim 1, wherein the injection-molded longitudinal and transverse ribs between the two columns are injection molded to:
    a sealing frame configured for an engine radiator,
    fixing elements configured for a proximity control system,
    fixing elements configured for a deflection plate to prevent intake of snow,
    fixing elements configured for the engine radiator,
    levelling elements configured for a bumper and the engine radiator,
    guiding walls configured for intake of air,
    receivers configured for engine hood bumpers,
    a hanging device configured for a support strut to support the engine hood, or
    support plates configured for an upper edge of a body component.

4. The front end module of claim 1, wherein the injection-molded longitudinal and transverse ribs include receivers configured for
    engine hood bumpers, or
    fixing of handling equipment to transport and position the front end module during installation.

5. The front end module of claim 1, wherein the tubular cross-member has receiving elements for an engine hood lock.

* * * * *